US012741521B2

(12) United States Patent
Chambers

(10) Patent No.: US 12,741,521 B2
(45) Date of Patent: Sep. 22, 2026

(54) TAILGATE COVERING WITH MODULAR PADS

(71) Applicant: RAILIAS HOLDINGS, LLC, San Diego, CA (US)

(72) Inventor: Casey M. Chambers, San Diego, CA (US)

(73) Assignee: Casey Chambers, Boise, ID (US)

(*) Notice: Subject to any disclaimer, the term of this patent is extended or adjusted under 35 U.S.C. 154(b) by 321 days.

(21) Appl. No.: 18/639,726

(22) Filed: Apr. 18, 2024

(65) Prior Publication Data

US 2025/0326282 A1 Oct. 23, 2025

(51) Int. Cl.
*B60J 11/06* (2006.01)
*B62H 3/10* (2006.01)
*B60R 1/26* (2022.01)

(52) U.S. Cl.
CPC ................ *B60J 11/06* (2013.01); *B62H 3/10* (2013.01); *B60R 1/26* (2022.01)

(58) Field of Classification Search
CPC ... B60R 9/10; B60R 1/26; B60J 11/06; B62H 3/10
See application file for complete search history.

(56) References Cited

U.S. PATENT DOCUMENTS 6,848,873 B1 2/2005 Husk
7,673,922 B1 3/2010 Grimes
7,810,196 B1 10/2010 Pritchard et al.
7,862,268 B2 1/2011 Dibner
8,303,221 B2 11/2012 Lenz
9,321,408 B2 4/2016 Tofte et al.
10,300,861 B1 * 5/2019 Green ....................... B60R 7/02
10,343,617 B2 7/2019 Cox
10,696,236 B1 6/2020 Starkey
10,857,950 B2 12/2020 Cox (Continued)

OTHER PUBLICATIONS

Rolling Fork Mount'. Railias. Jun. 5, 2020 [online], Retrieved from https://www.facebook.com/107594707588711/videos/268748344481746.

(Continued)

*Primary Examiner* — Amy R Weisberg
*Assistant Examiner* — Alma D. Schuster
(74) *Attorney, Agent, or Firm* — John M. Rogitz; John L. Rogitz

(57) ABSTRACT

In one aspect, a tailgate covering for a pickup truck has three segments for positioning against three respective surfaces of the pickup truck's tailgate. Modular pads are also included and may be couplable to the covering at various positions to provide cushioning for diagonal downtubes of bicycles that are being transported in the bed of the truck. The modular pads may therefore provide protection at the top inner ridge of the tailgate to protect both the tailgate and the bicycle. The modular pads may be swapped in and out and repositioned as desired. Additional modular pads may be included on the front of the covering and may be moved to different vertical positions to accommodate backup cameras at different locations on different truck models. The covering may also include innovative straps that couple the covering to the tailgate while reducing potential damage to the tailgate otherwise caused by the straps.

20 Claims, 13 Drawing Sheets

(56) References Cited

U.S. PATENT DOCUMENTS

| | | | | |
|---|---|---|---|---|
| 10,864,839 | B1 | 12/2020 | Chambers et al. | |
| 10,875,442 | B1 | 12/2020 | Combs, Jr. et al. | |
| 11,491,856 | B2 | 11/2022 | Low et al. | |
| 11,643,022 | B2 | 5/2023 | Ward et al. | |
| 11,760,271 | B2 | 9/2023 | Low et al. | |
| 2002/0012576 | A1 | 1/2002 | Anderson | |
| 2003/0129038 | A1 | 7/2003 | Addy | |
| 2006/0099044 | A1 | 5/2006 | Johnson | |
| 2007/0182192 | A1 | 8/2007 | Meyers et al. | |
| 2008/0053930 | A1 | 3/2008 | Rohde | |
| 2010/0215455 | A1 | 8/2010 | Burris | |
| 2014/0263926 | A1 | 9/2014 | LeAnna | |
| 2022/0001808 | A1* | 1/2022 | Low | B60R 13/01 |
| 2022/0063508 | A1* | 3/2022 | Shneyer | B60R 9/10 |
| 2022/0379817 | A1* | 12/2022 | Gu | B60R 9/06 |

OTHER PUBLICATIONS

Chambers et al., "Tailgate Utility Rail and Attachments", file history of related U.S. Appl. No. 16/654,609, now U.S. Pat. No. 10,864,839, issued Dec. 15, 2020.

Chambers et al., "Tailgate Utility Rail and Attachments", file history of related U.S. Appl. No. 11/897,432, now U.S. Pat. No. 11,897,432, issued Feb. 13, 2024.

* cited by examiner

TAILGATE COVERING WITH MODULAR PADS

FIELD

The disclosure below relates generally to tailgate coverings with modular pads.

BACKGROUND

As recognized herein, tailgate coverings can be used by cyclists that drive pickup trucks so that the cyclists can transport large numbers of bicycles all at once without damaging their trucks. Specifically, the bicycles can be braced against the pickup truck's tailgate during travel, with the tailgate covering preventing damage to the tailgate itself. However, as further recognized herein, existing tailgate coverings provide inadequate tailgate protection for many modern bicycles and can also block the pickup truck's backup camera. Existing tailgate coverings are also not as durable as one might desire. There are currently no adequate solutions to the foregoing problems.

SUMMARY

Bicycles consistent with present principles may include mountain bikes and street racing bikes, as well as other types of pedal bikes. Motor bikes may also be used consistent with present principles, as well as still other sporting equipment.

Accordingly, in one aspect an apparatus includes a covering configured to engage a vehicle tailgate. The covering includes a first segment configured for positioning on a first surface of the vehicle tailgate. The first surface faces backwards away from a vehicle to which the vehicle tailgate is couplable while the vehicle tailgate is in an upright position as coupled to the vehicle. The first segment includes a window. The covering also includes a second segment configured for positioning on a second surface of the vehicle tailgate. The second surface is orthogonal to the first surface. The covering further includes a third segment configured for positioning on a third surface of the vehicle tailgate. The third segment is coupled to the first segment via the second segment, and the third surface is orthogonal to the second surface. The apparatus also includes a first pad and a second pad. The first pad is configured to removably engage the second segment and the third segment to provide, at an angle oblique to the second and third surfaces, a cushion for a downtube of a bicycle. The first pad includes an opening configured to receive part of the downtube. The second pad is different from the first pad and is configured to slide along one or more elements on the covering. The second pad is configured to slide, via the one or more elements, in a plane parallel to the first segment to uncover a portion of the window to provide a field of view through the portion of the window for a backup camera on the vehicle.

In some example implementations, the apparatus may also include a third pad. The third pad may be different from the first and second pads. The third pad may be configured to slide along the one or more elements on the covering. The third pad may be configured to slide, via the one or more elements, in a plane parallel to the first segment to uncover the portion of the window to provide the field of view via a spaced positioning, on the first segment, of the third pad with respect to the second pad. If desired, the second and third pads may also be configured to maintain the spaced positioning on the first segment to both maintain the field of view and provide cushioning at one or more areas around the portion of the window. For example, the second pad may include a first hook and loop fastener component, the third pad may include a second hook and loop fastener component, and the one or more elements may include at least a third hook and loop fastener component that is reciprocal to the first and second hook and loop fastener components to engage the first and second hook and loop fastener components to maintain the spaced positioning.

In some instances, the one or more elements may include one or more rails.

Also in some instances, the first pad may include a first coupling element to removably engage the first pad with the second segment and the third segment. If desired, the first coupling element may include a first hook and loop fastener component configured to engage a reciprocal, second hook and loop fastener component on the covering. The second hook and loop fastener component may be disposed on the second segment and/or the third segment. More broadly, at least one of the second and third segments may include a second coupling element that is couplable to the first coupling element to removably engage the first pad with the second segment and the third segment. The apparatus may also include a first strap engageable with the second coupling element. The first strap may be configured to, while engaged with the second coupling element, secure the part of the downtube within the opening.

Still further, in some examples the apparatus may include a second strap configured to secure the covering to the vehicle tailgate. The second strap may include a hook configured to engage a loop on the first segment to establish a first anchor point. The second strap may also be engageable with the third segment to establish a second anchor point. The second strap may include a buckle through which a loose end portion of the second strap is feedable from a direction of the first anchor point and toward the second anchor point to tighten the second strap between the first and second anchor points to secure the covering to the vehicle tailgate.

In another aspect, a method includes providing, as part of a covering for a vehicle tailgate, a first segment configured for positioning on a first surface of the vehicle tailgate. The first surface faces backwards away from a vehicle to which the vehicle tailgate is couplable while the vehicle tailgate is in an upright position as coupled to the vehicle. The first segment includes a window. The method also includes providing, as part of the covering for the vehicle tailgate, a second segment configured for positioning on a second surface of the vehicle tailgate. The second surface is orthogonal to the first surface. The method also includes providing, as part of the covering for the vehicle tailgate, a third segment configured for positioning on a third surface of the vehicle tailgate. The third segment is coupled to the first segment via the second segment. The third surface is orthogonal to the second surface. The method also includes proving a first pad. The first pad is configured to removably engage the second segment and the third segment to provide, at an angle oblique to the second and third surfaces, a cushion for a downtube of a bicycle. The first pad includes an opening configured to receive part of the downtube.

In some examples, the method may also include providing a second pad different from the first pad. The second pad may be configured to slide along one or more elements on the covering. The second pad may be configured to slide, via the one or more elements, in a plane parallel to the first segment to uncover a portion of the window to provide a field of view through the portion of the window for a backup camera on the vehicle.

Also in some examples, the first pad may include a first coupling element to removably engage the first pad with the second segment and the third segment. At least one of the second and third segments may include a second coupling element that is couplable to the first coupling element to removably engage the first pad with the second segment and the third segment. In some specific instances, the method may also include providing a strap engageable with the second coupling element. The strap may be configured to, while engaged with the second coupling element, secure the part of the downtube within the opening.

In still another aspect, an apparatus includes a covering configured to engage a vehicle tailgate. The covering includes a first segment configured for positioning on a first surface of the vehicle tailgate. The first surface faces backwards away from a vehicle to which the vehicle tailgate is couplable while the vehicle tailgate is in an upright position as coupled to the vehicle. The covering also includes a second segment configured for positioning on a second surface of the vehicle tailgate. The second surface is orthogonal to the first surface. The covering also includes a third segment configured for positioning on a third surface of the vehicle tailgate. The third segment is coupled to the first segment via the second segment. The third surface is orthogonal to the second surface. The apparatus also includes a first pad and/or a second pad. The first pad is configured to removably engage the cover to provide, at an angle oblique to the second and third surfaces, a cushion for a bicycle. The second pad is different from the first pad and is configured for selective coupling to the covering to provide a field of view for a camera on the vehicle.

If desired, in some examples the apparatus may include a third pad. The third pad may be configured to removably engage the cover to provide, at an angle oblique to the second and third surfaces, a cushion for a piece of sporting equipment, the third pad being wider than the first pad.

The details of the present application, both as to its structure and operation, can best be understood in reference to the accompanying drawings, in which like reference numerals refer to like parts, and in which:

DETAILED DESCRIPTION

Figure 1:
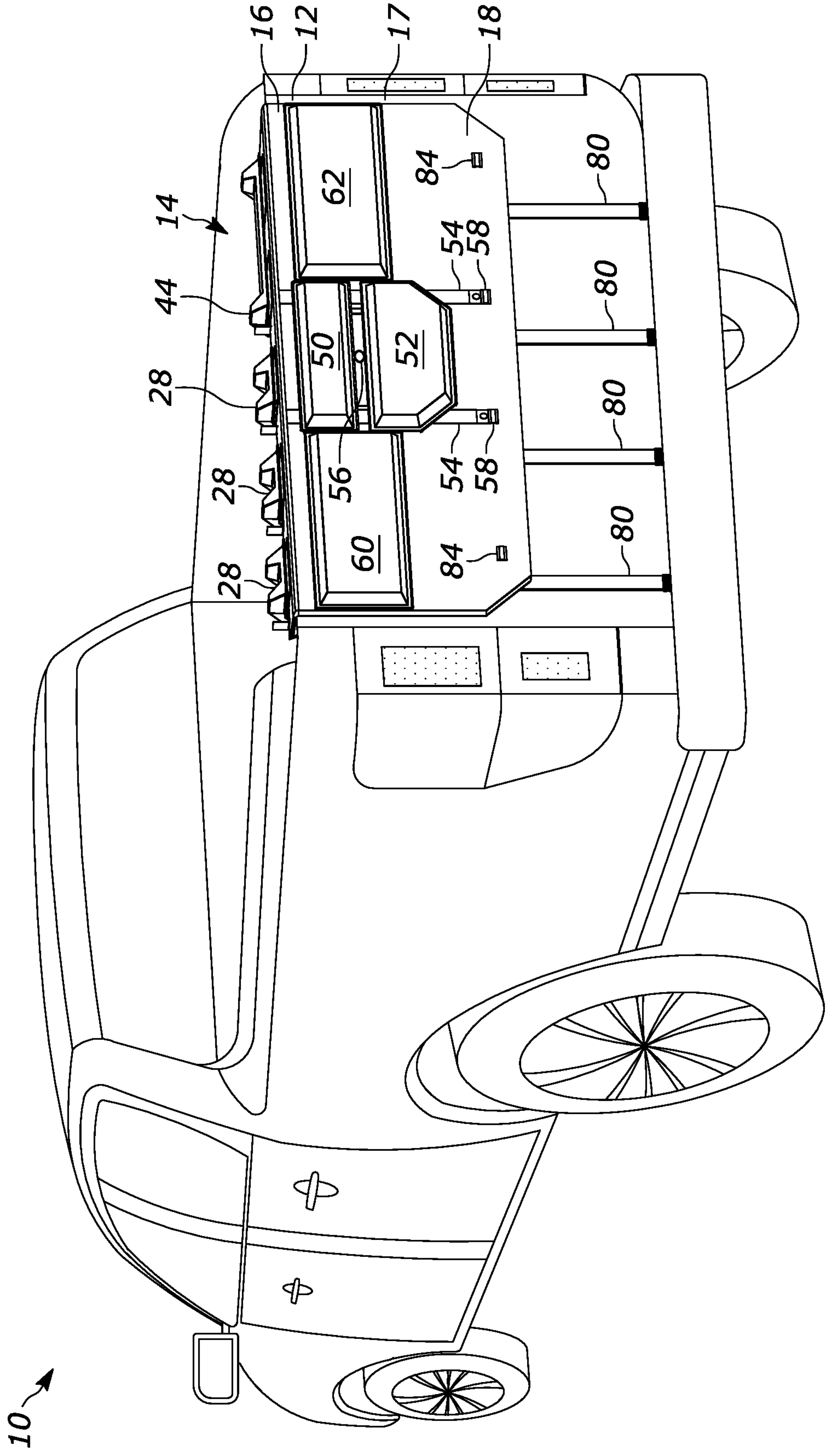
FIG. 1 shows a rear perspective view of an apparatus consistent with present principles, as secured to a tailgate of a pickup truck.

Referring initially to FIG. 1, a rear perspective view is shown of a pickup truck 10 having a tailgate 12. Note that the tailgate 12 faces backwards away the truck 10 while the tailgate 12 is in its upright, locked position as coupled to the truck 10.

As also shown in FIG. 1, an apparatus 14 consistent with present principles has been removably coupled to the tailgate 12. The apparatus 14 may include a tailgate covering 16 that establishes a tailgate protector pad. The covering 16 may be configured to engage the tailgate 12 or other rear portion of a vehicle (e.g., hatchback door of a hatchback vehicle). As such, the covering 16 may include a first segment 18 configured for positioning on/against a first surface of the vehicle tailgate 12, which in this case is the paint-bearing exterior surface 17 of the tailgate 12 that faces backwards away from the truck 10 while the tailgate 12 is coupled to the truck 10 and latched, locked, or otherwise positioned in is upright (vertical) position as shown. The tailgate 12 may be coupled to the truck 10 itself using cables and a hinge between the tailgate and truck 10 (and/or using other hardware components).

Figure 2:
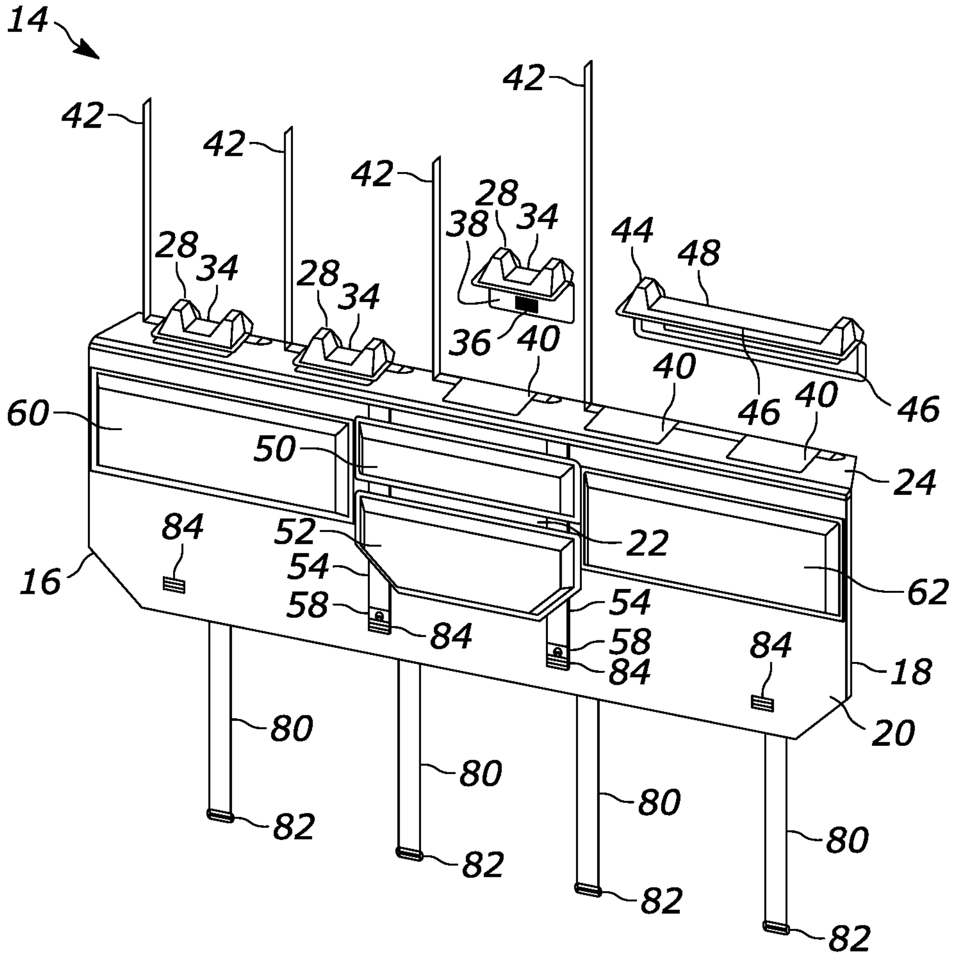
FIG. 2 shows a front isometric view of the apparatus consistent with present principles.

FIG. 2 also shows the apparatus 14 but in isometric view, sans vehicle 10 and tailgate 12. As shown in this figure, the first segment 18 may be flat and smooth on a first side to rest against some or all of the first surface 17 of the tailgate 12 in a plane parallel to the first surface 17, abutting the exterior of the tailgate 12 to protect the tailgate's paint and to minimize denting from a bicycle placed over the tailgate 12 that might jostle during vehicle travel consistent with present principles. A second, opposite side 20 of the first segment 18 as shown in FIG. 2 may face backwards away from the vehicle 10. Note that the first segment 18 may also include a window 22, which will be described in greater detail later.

FIG. 2 also shows that the covering 16 may include a second segment 24 configured for positioning on/against a second surface of the vehicle tailgate 12, such as the top surface of the tailgate 12. The second surface of the tailgate 12 may thus be orthogonal to the first surface 17 and may face upward according to a horizontal plane while the tailgate 12 is in its upright position on the vehicle 10 as already shown in FIG. 1.

Figure 3A:
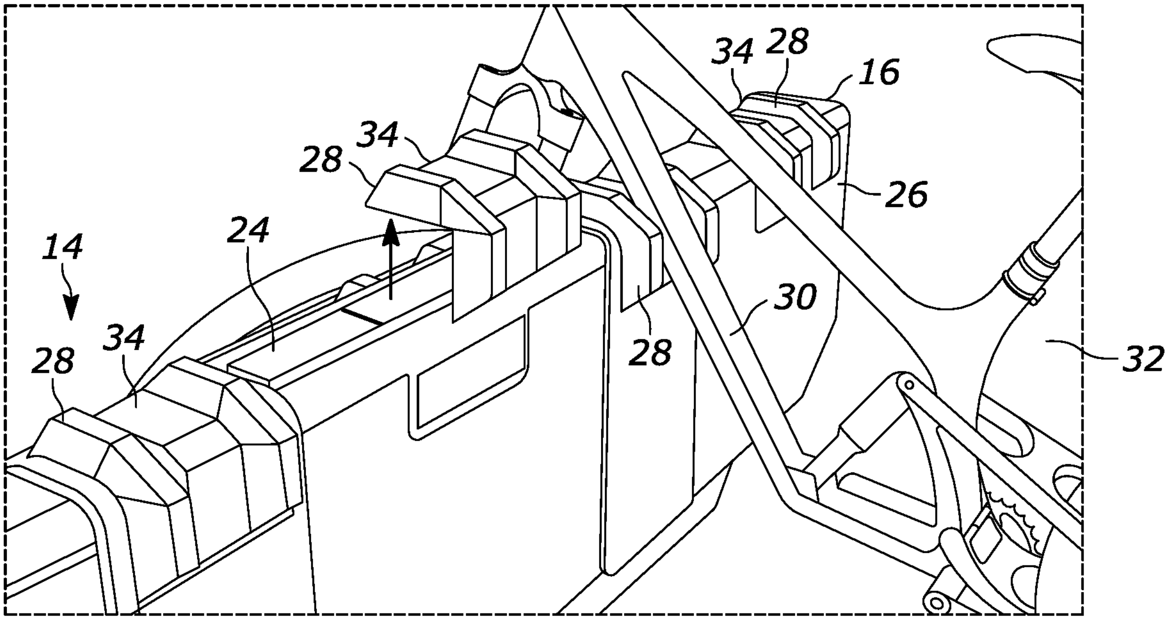
FIG. 3A shows a rear isometric partial view of the apparatus, with a bicycle also positioned up against the apparatus consistent with present principles.
Figure 3B:
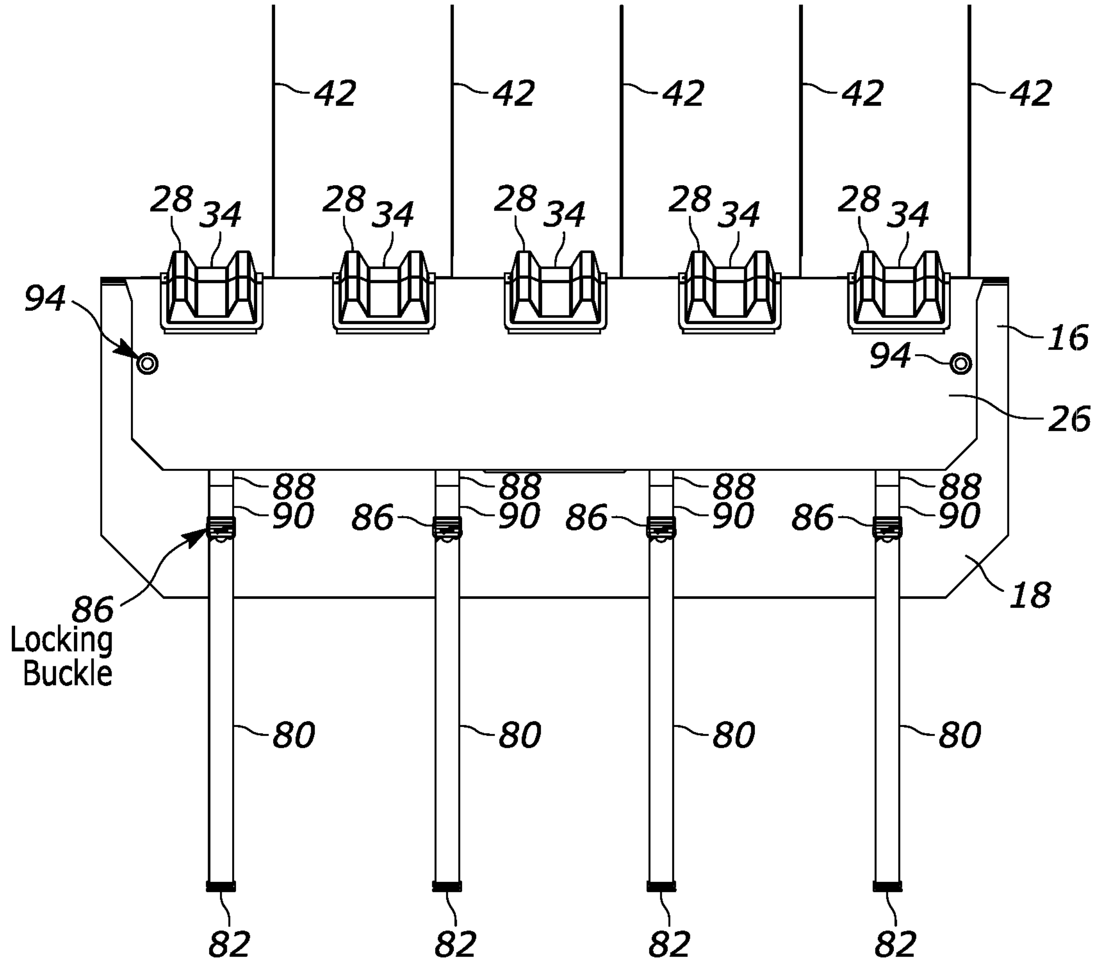
FIG. 3B shows a rear elevational view of the apparatus consistent with present principles.

FIGS. 3A and 3B show a third segment 26 of the covering 16 that opposes the first segment 18. The third segment 26 may be configured for positioning on/against a third surface of the vehicle tailgate 12, which in this case is a vertical surface of the tailgate 12 that faces inward toward the truck bed and cab of the truck 10 when the tailgate 12 is in the upright position on the vehicle 10 per FIG. 1. The third surface is therefore disposed vertically with respect to the truck 10 when the tailgate 12 is in the upright position, and disposed horizontally with respect to the truck 10 when the tailgate 12 is in the down position. The third surface is therefore orthogonal to the second surface of the tailgate 12 and parallel to the first surface 17.

The third segment 26 itself is coupled to the first segment 18 via the second segment 24. The first segment 18 and third segment 26 may thus be parallel to each other while the covering 16 is placed over the tailgate 12, and the second segment 24 may be orthogonal to the first segment 18 and third segment 26 while the covering 16 is placed over the tailgate 12.

The first segment 18, second segment 24, and third segment 26 themselves may be made integral with each other, with each one having a greater width than height (e.g., but a similar/same thickness). In certain non-limiting examples, the faces of the segments 18, 24, and 26 that face outward away from the tailgate 12 in each respective direction may be made of polyvinyl chloride (PVC) tarpaulin. Opposite faces of the segments 18, 24, and 26 that abut the respective outer surfaces of the tailgate 12 may be made of a micro-brushed inner liner. If desired, a soft density inner foam may be sandwiched between the PVC tarpaulin layer and the micro-brushed inner layer for each of the segments 18, 24, and 26 to provide padding to protect the tailgate 12.

As also shown in FIGS. 1-3B, the apparatus 14 may also include one or more removable first pads 28. The pads 28 may be made of soft density foam or other suitable material. In one example embodiment, the first pads 28 may be custom, removable downtube pads that contact a bicycle frame at a top corner of the tailgate 12 when the frame is placed over the tailgate 12 with the covering 16 thereon. As such, each first pad 28 may be configured to removably engage the second segment 24 and the third segment 26 to provide, at an angle oblique to the second surface and third surface of the tailgate 12, a cushion for a downtube 30 of a bicycle 32. Each first pad 28 may include an opening 34 configured to receive a lengthwise segment of the downtube 30, as best shown in FIGS. 3A and 3B.

Present principles recognize that cushioning at the oblique angle is desirable since many bicycle downtubes, when the head tube, fork, and front wheel of the bicycle 32 are hung over the back of the tailgate 12 (and hence outside of the truck 10) while the rest of the bicycle 32 remains inside the truck bed, would contact the tailgate 12 and/or cover 16 at the oblique angle. Yet absent the pad 28 providing cushioning at the oblique angle, the downtube 30 might cause damage like denting to the vehicle tailgate 12 itself (e.g., at the top inner edge of the tailgate between the second and third surfaces). The downtube 30 itself might also be damaged absent the pad 28.

Present principles also recognize that the pads 28 being modular for removable engagement with the covering 16 may also be desirable so that the pads 28 may be moved around to a desired covering location and also so that, should one of the pads 28 wear out, the worn out pad 28 may be replaced with another pad 28 without having to replace the entire covering 16. The modular pads 28 may also be exchanged for pads of other shapes and/or dimensions as desired and depending on which object(s) the user wishes to securely transport.

As best shown in FIG. 2, each first pad 28 may include a respective first coupling element 36 on the underside(s) 38 of the pad 28 that are orthogonal to each other. The first coupling element 36 may be configured to removably engage the first pad 28 with the second segment 24 and the third segment 26 via a second coupling element 40 on the covering 16. The second coupling element 40 may thus engage the first coupling element 36 on the pad 28 to couple the pad 28 to the covering 16. For example, the first coupling element 36 may include a first hook and loop fastener component (e.g., hooks) that is configured to engage a reciprocal, second hook and loop fastener component 40 on the covering 16 (e.g., loops). As one specific example, Velcro® loops may establish the first coupling element 36, while Velcro® hooks may establish the second coupling element 40, or vice versa. Other coupling elements may also be used to secure or otherwise couple the pads 28 to the segments 24 and 26, such as dual lock tape, buttons, zippers, cables, screws, and other reusable/multi-use fasteners. Zip ties and still other single-use fasteners might also be used. These are examples and still other fasteners may also be used.

Still in reference to the second coupling element 40, note that while FIG. 2 shows the coupling element 40 secured to the second segment 24 (e.g., via stitching, glue, etc.), it may additionally or alternatively be secured to the third segment 26 (and/or any intervening tailgate segments) to still removably engage the first pad 28 with the second segment 24 and the third segment 26.

FIG. 2 also shows that a respective strap 42 may be included as part of the apparatus 14. Each strap 42 may be made of nylon webbing or other suitable material. The strap 42 may be engageable with the second coupling element 40. For example, the second coupling element 40 may be rectangular and may be sewn, glued, or otherwise secured to the surface 24 and/or surface 26 at lengthwise edge portions of the element 40. The fastening of the element 40 to the surface(s) 24/26 may thus run left to right along the apparatus 14. But the other two edge portions of the rectangular coupling element 40 that are orthogonal to the lengthwise edge portions may not be sewn or otherwise secured so that a channel is created between the element 40 and surface 24/26, with an opening to the channel being located at each unsecured side of the element 40. This allows the strap 42 to be fed through one of those openings, into and through the channel from one side, and out the opening on the other side of the element 40 (as shown in FIG. 2). A user may then wrap the loose ends of the strap 42 around the downtube 30 and tie them together so that the strap 42, while engaged with the second coupling element 40 via the channel, secures the downtube 30 within the opening 34 on the pad 28. This in turn secures the downtube 30 to the covering 16 and hence to the tailgate 12 itself (while the covering 16 is secured to the tailgate 12 as will be described in greater detail later).

FIGS. 1 and 2 also show that one or more additional, wider pads 44 may also be included as part of the apparatus 14 for removable engagement with the covering 16. The pads 44 may be made of the same material as the pads 28 to cushion other sporting equipment at an angle oblique to the second and third surfaces of the tailgate 12. The other sporting equipment might be a surfboard, snowboard, or pair of skis, since those pieces of sporting equipment might also contact the covering 16/tailgate 12 at an oblique angle (relative to the second and third surfaces of the tailgate 12) when placed in the bed of the truck 10. This helps to protect the sporting equipment, covering 16, and/or tailgate 12 from damage due to jostling of the sporting equipment during transport. In one specific example, the pad 44 may be twice as wide as the pads 28.

Each of the additional pads 44 may be configured to removably engage the cover 16 similar to the pads 28. As such, respective left and right edge portions of the orthogonal underside(s) 46 of the pad 44 may include one or more coupling elements similar to the elements 36 for engagement with a reciprocal second coupling element 40 on the covering 16. Accordingly, note that the elements 40 may be used for removably engaging different sizes of pads. FIG. 2 in particular also demonstrates that a respective strap 42 may be fed through channels in two different coupling elements 40 so that the strap 42 may be used to tie down the wider sporting equipment accommodated by an opening 48 in the pad 44 when the pad 44 is engaged with the covering 16.

For completeness, note that although generally rectangular pads 28 and 44 have been described above, modular pads of other shapes and sizes may also be used as desired. Some example pads may not even include an opening like the openings 34, 48, whether the same shape as the pads 28, 44 or different.

Figure 4:
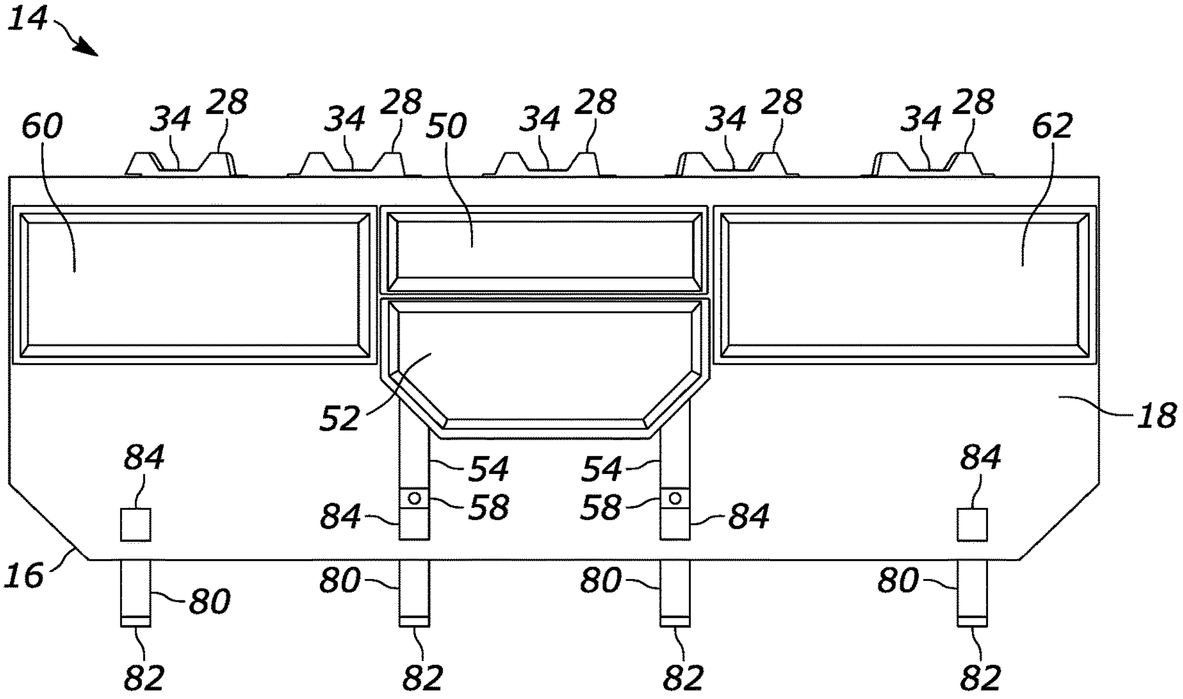
FIG. 4 shows a front elevational view of the apparatus consistent with present principles.

Moving on to another feature of the apparatus 14 and as best shown in FIGS. 1, 2, and 4, the apparatus 14 may further include a second pad 50 and third pad 52 that are different from the first pads 28 (and different from the additional pad 44). The pads 50, 52 may be made of soft density foam or other suitable material. The pads 50, 52 may be configured to slide along one or more elements 54 on the covering 16. In the present example, the elements 54 are rails made of braided fabric, though other types of tracks and other types of materials (e.g., polymers) may also be used for the elements 54. The pads 50, 52 may be configured to slide or otherwise move, via the one or more elements 54, in a plane parallel to the first segment 18 to uncover a portion of the window 22 to provide a field of view through the portion of the window 22 for a backup camera 56 on the vehicle 10 (the camera 56 being shown in FIG. 1 as located on the tailgate 12). The camera 56 may be a red-green-blue digital camera, an infrared (IR) camera, and/or other type of camera. The uncovered portion of the window 22 may also provide access to a tailgate handle that might be used to unlatch the tailgate 12 from its upright position on the truck 10. Accordingly, in using the movable pads 50, 52, a standardized apparatus 14 may accommodate different camera locations and tailgate handle locations for different vehicle makes and models.

Figures 5A, 5B:
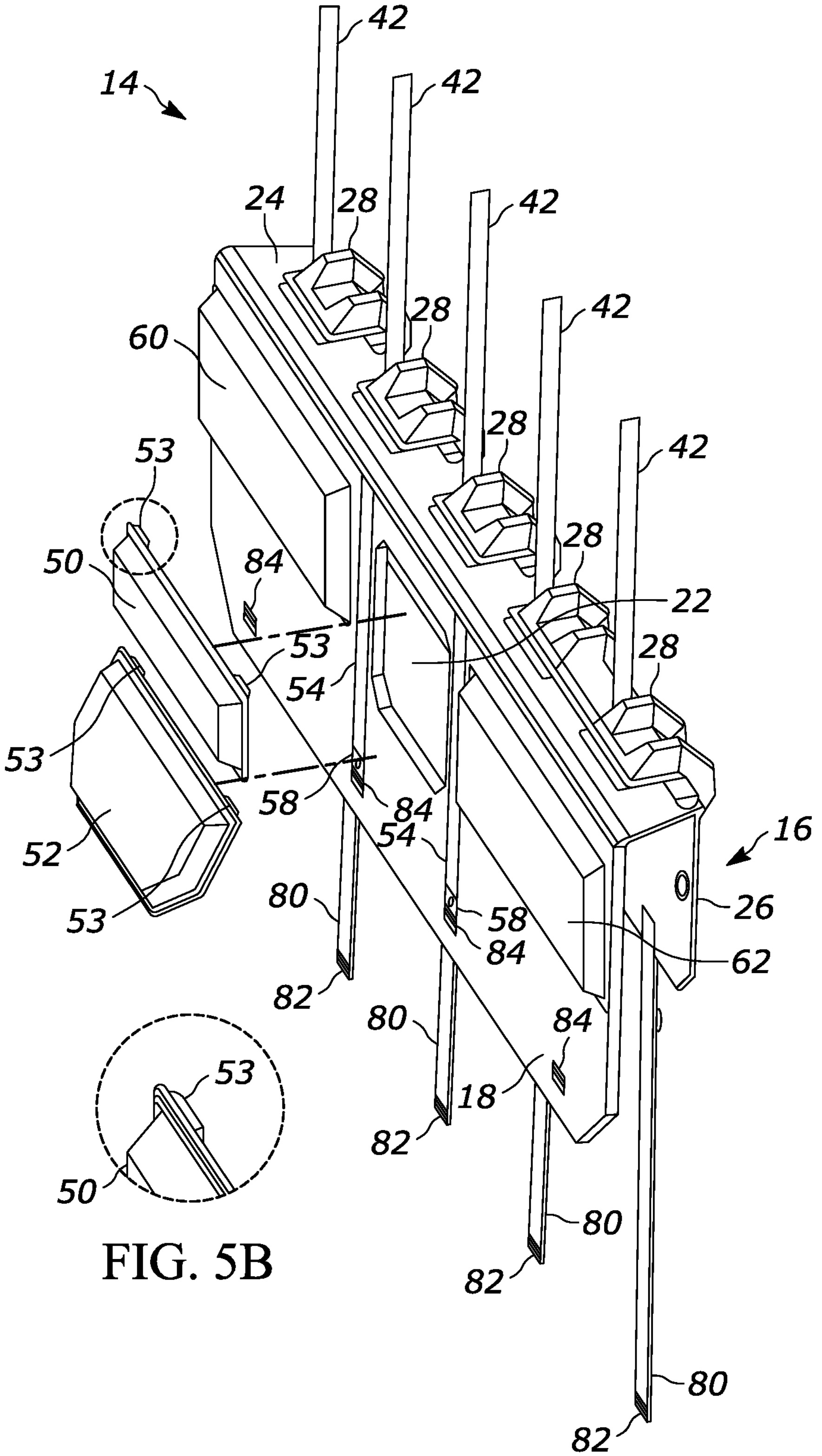
FIGS. 5A, 6A, and 6C show additional front isometric views of the apparatus consistent with present principles.
FIGS. 5B, 5C, and 6B show detailed partial isometric views of front pads of the apparatus consistent with present principles.
Figure 5C:
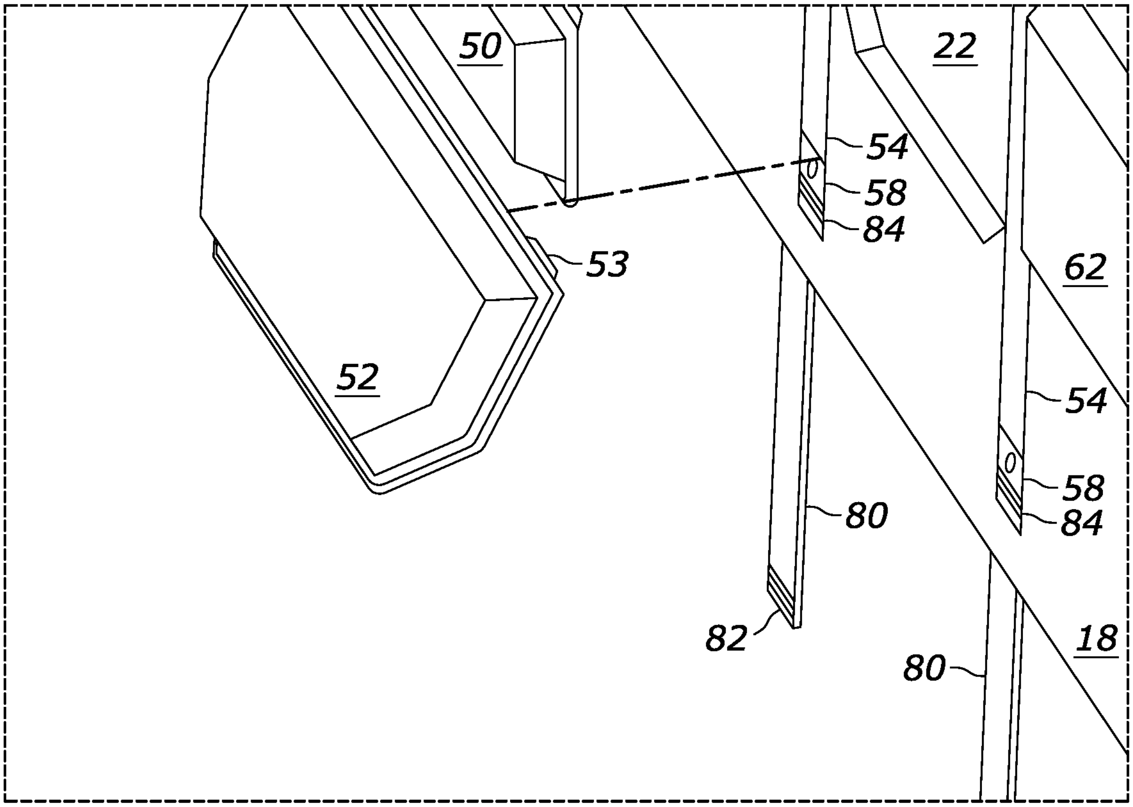

The pads 50, 52 themselves may be configured to slide up and down on the elements 54 via loops 53 in the back sides of the pads 50, 52 that abut the segment 18, with the elements 54 extending through the loops 53. The loops 53 are shown in greater detail in the upper isometric view of FIG. 5A, as well as the detailed partial views of FIGS. 5B and 5C. These loops 53, located at the top inner corners of the pads 50, 52, may thus capture the elements 54 (e.g., webbing rails) so that the pads 50, 52 may slide along the elements 54.

Accordingly, while lower end segments 58 of the elements 54 are loose, the bottoms of the elements 54 may be fed through the loops 53 (or other openings) in the back sides of the pads 50, 52 to removably engage the pads 50, 52 with the elements 54 (and hence covering 16). The pads 50, 52 may also be disengageable or otherwise removable from the elements 54 via the lower end segments 58 when loose, disengaging the pads 50, 52 from the covering 16 by removing the elements 54 from the loops 53. As such, note that the segments 58 themselves may include buttons or other fasteners to removably secure the segments 58 to reciprocal fastening components on the segment 18 so that the pads 50, 52 may be removed while the segments 58 are unfastened but removably secured while the segments 58 are fastened. Also note for completeness that upper end segments of the elements 54 may be stitched into, glued, or otherwise secured to the segment 18.

Figure 6A:
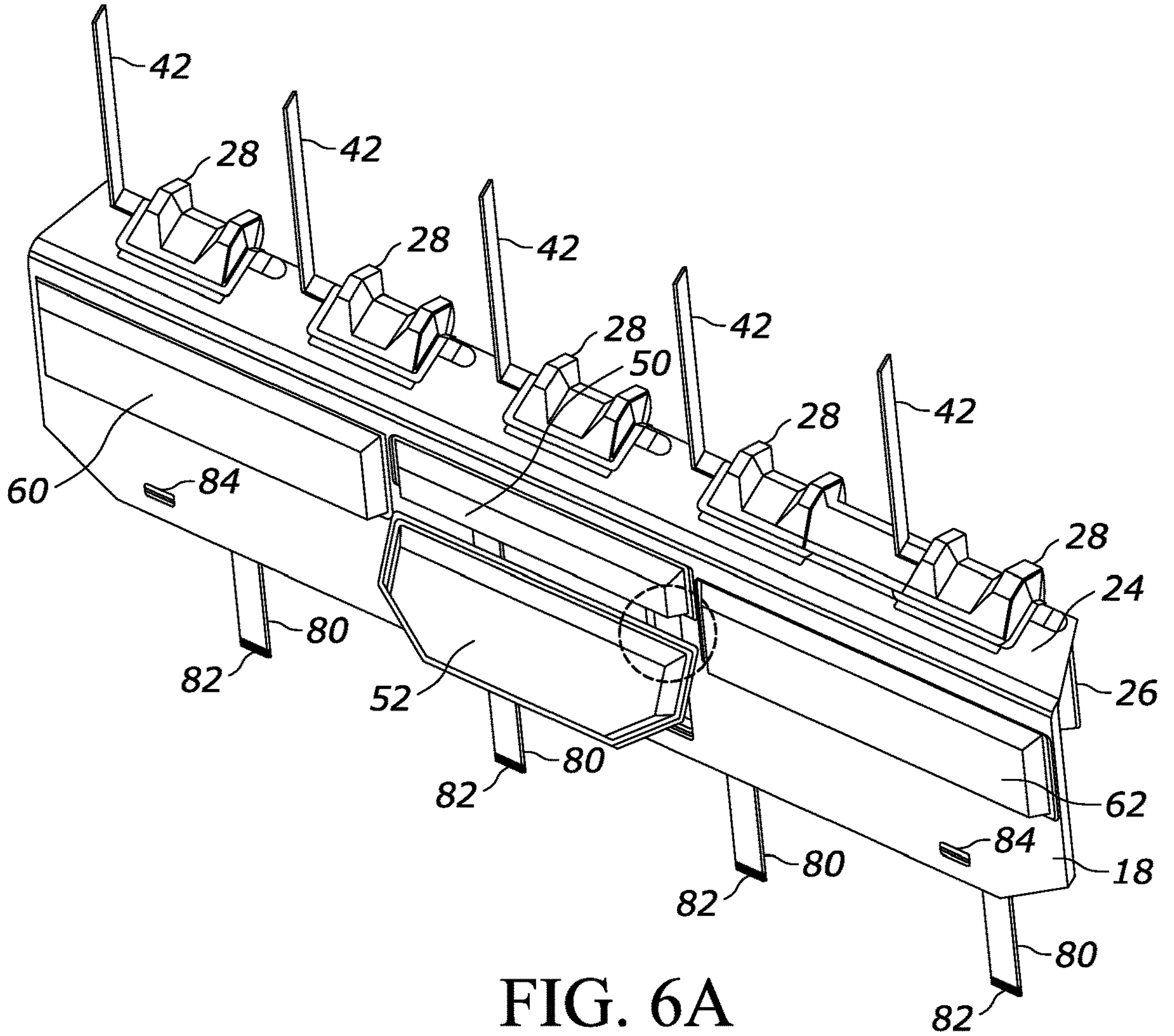
Figure 6B:
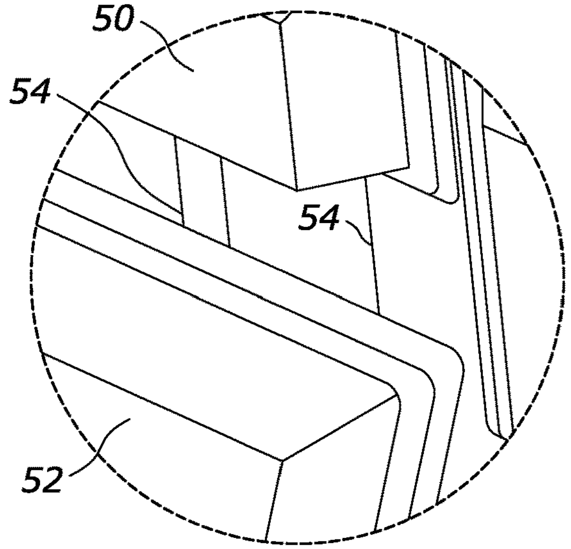
Figure 7A:
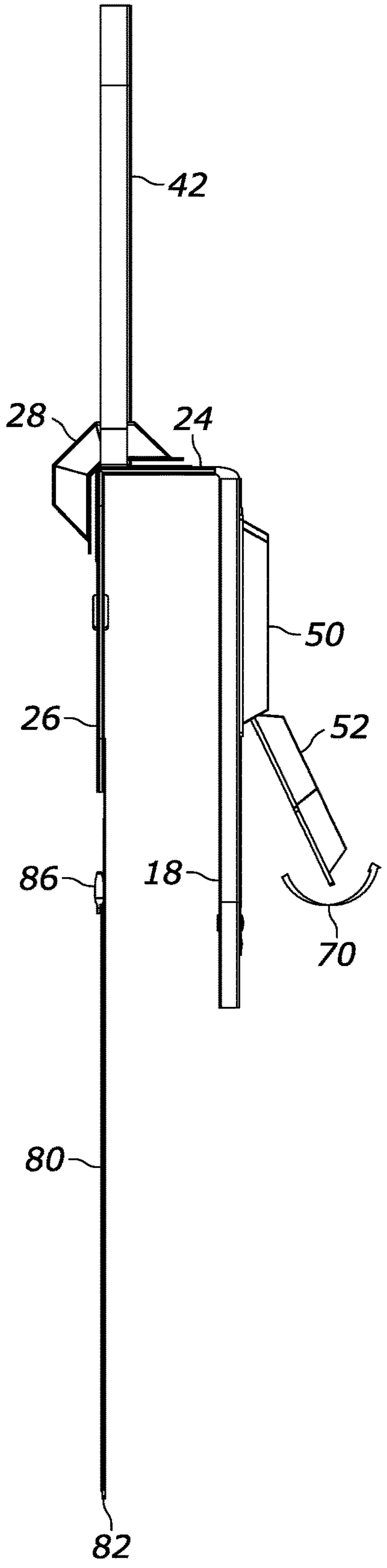
FIGS. 7A and 7B are side elevational views of the apparatus consistent with present principles.

Accordingly, the pads 50, 52 may be configured to slide, via the one or more elements 54, in a plane parallel to the first segment 18 to uncover the portion of the window 22 to provide the field of view for the camera 56 via a spaced positioning, on the first segment 18, of the pads 50, 52 with respect to each other. In one example as shown in FIGS. 6A and 7A, the sliding action may be performed via the user lifting/rotating the bottoms of the pads 50, 52 up away from the segment 18 (illustrated by arrow 70 in FIG. 7A) about an axis established by an upper left-to-right edge portion of either pad 50, 52 due to the engagement of the loops 53 on the respective pad 50, 52 with the elements 54.

Figure 6C:
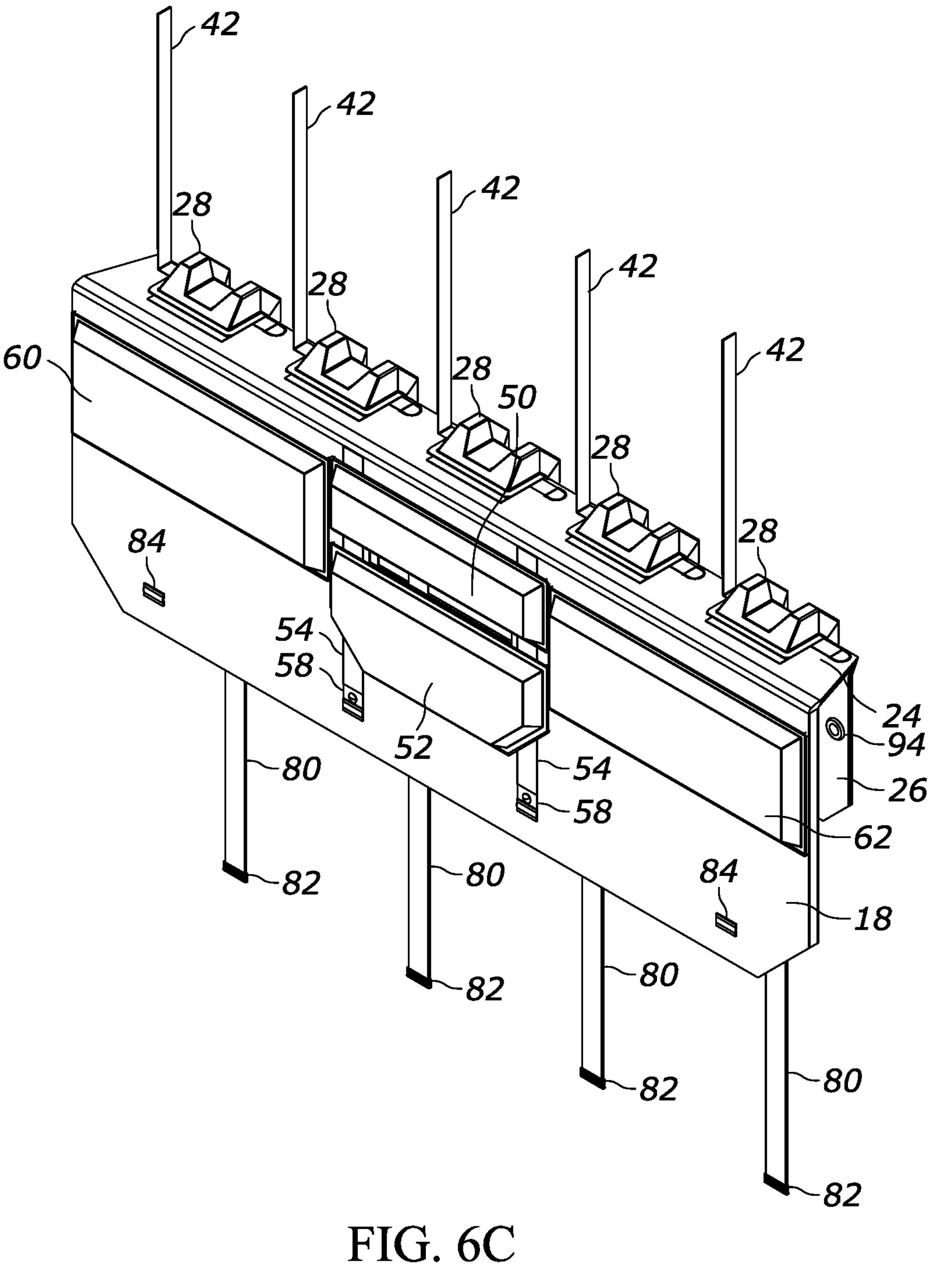
Figure 7B:
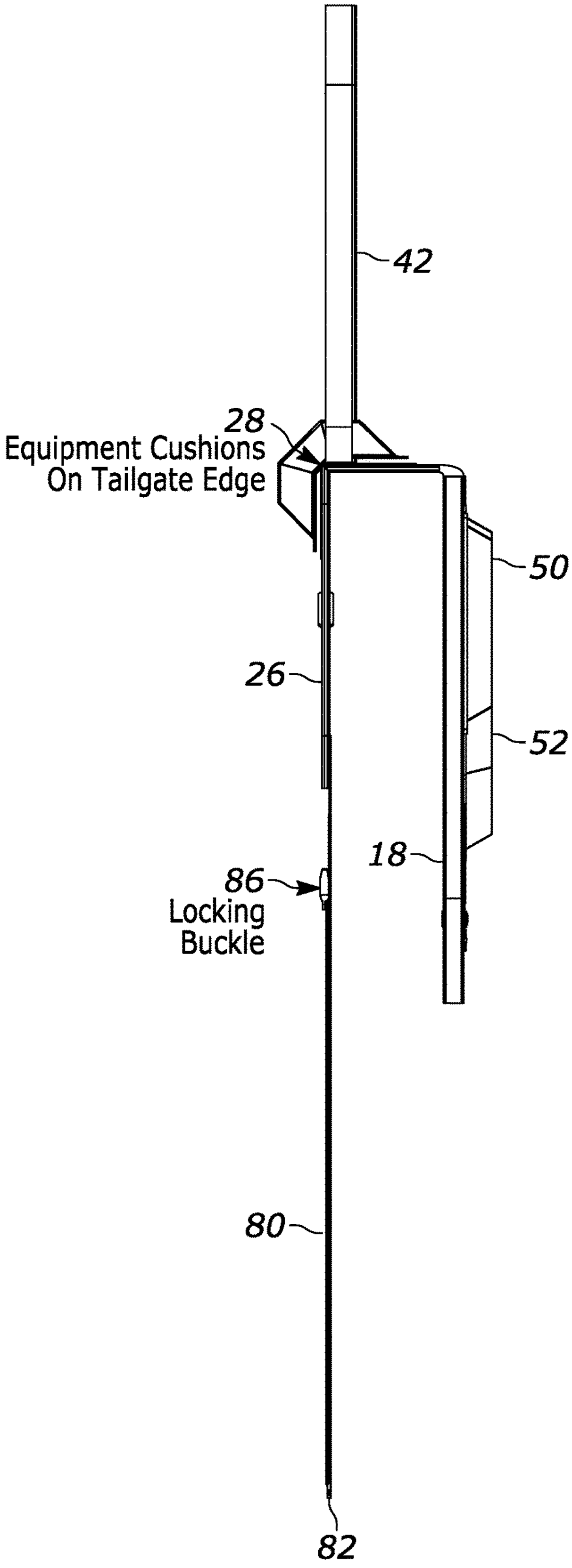

Also note that this rotation of the bottom of either pad 50, 52 may overcome removable engagement of lower and mid portions of the pads 50, 52 with the element 54, with the removable engagement itself being implemented by via reciprocal coupling elements that may be similar to the coupling elements 36, 40 described above (e.g., reciprocal Velcro® elements). Accordingly, first reciprocal coupling elements may be affixed to the back sides of the pads 50, 52, while second reciprocal coupling elements may be affixed to the front sides of the elements 54. Thus, a respective first reciprocal coupling element on the pad 50/52 may removably engage a respective second reciprocal coupling element on the element 54 when the pads 50, 52 are placed flat against the elements 54/segment 18. This establishes a selective coupling of the pads 50, 52 to the elements 54/segment 18, but the pads 50/52 may still be disengaged from the second reciprocal coupling elements when either pad 50, 52 is rotated up away from the segment 18 as demonstrated in FIG. 7A. In contrast, FIGS. 6C and 7B show the first and second coupling elements on the pads 50/52 and element 54 being engaged, with the pads 50, 52 laying flat against the segment 18.

In reference to FIG. 7A again, it may be appreciated that with the lower and mid sections of the pads 50, 52 rotated up away from the segment 18 as shown, the reciprocal first and second coupling elements of the pads 50/52 and elements 54 are disengaged from each other. This allows the loops 53 (and hence pads 50, 52) to be slid freely along the elements 54 to change the vertical positioning of the pads 50, 52 with respect to the segment 18. This in turn allows the user to put the pads 50, 52 in a desired vertical position along the elements 54 to expose the backup camera 56 and/or tailgate handle between the pads 50, 52. The user may then rotate the pads 50, 52 back down flat onto the segment 18 to reengage the first coupling elements on the back of the pad 50/52 with the second coupling elements on the front of the elements 54. Accordingly, a vertically-spaced positioning of the pads 50, 52 with respect to each other may be held in place to leave the camera 56 exposed through the window 22, with the window 22 thus being partially accessible from exterior to the vehicle 10 via the spaced positioning. This in turn provides a field of view to the camera 56 that is external to the covering 16 itself (through the window 22 and gap between the pads 50, 52) so that the camera 56 may image the environment external to the rear of the truck 10. The images from the camera 56 (e.g., video) may then be presented on an in-vehicle display of the truck 10 to aid the user in backing up the truck 10/driving in reverse.

Based on the foregoing, it may be further appreciated that the pads 50, 52, may be configured to not only maintain the spaced positioning on the first segment 18 to maintain the field of view for the camera 56 but also to provide bicycle cushioning at one or more areas of the segment 18 around the exposed portion of the window 22. This configuration therefore allows a driver to see behind the vehicle via the backup camera 56 while at the same time protecting the covering 16 and rear-facing surface 17 of the tailgate 12 from damage from a bicycle wheel, fork, or other bike component while the bicycle 30 hangs over the tailgate 12 (and is secured to the covering 16 and hence tailgate 12) during travel.

To also help protect the covering 16 and tailgate 12, other pads 60, 62 may also be disposed to the left and right of the pads 50, 52. The pads 60, 62 may be made of soft density foam or other suitable material. The pads 60, 62 may be affixed to the segment 18 so that they are immovable, or may be removably engaged with the segment 18 via vertical elements similar to the elements 54 but positioned farther on the left and right sides of the segment 18 to engage the pads 60, 62.

Continuing the detailed description in reference to FIGS. 8A, 8B, and 8C, another aspect of the apparatus 14 will now be described. Specifically, additional straps 80 may be included on the apparatus 14. Beginning with FIG. 8A, it shows a rear perspective isometric view of the apparatus 14, including the straps 80. The straps 80 may be made of fabric (e.g., nylon webbing) or other suitable material. The straps 80 may be doubled-back on each other through respective G-hooks 82 (or other hooks or coupling components) such that two different longitudinal segments of each strap 80 are parallel to each other along the longitudinal axis of the strap 80.

Thus, the straps 80 may be used for securing the covering 16 to the tailgate 12 in an innovative way in that, while the tailgate 12 is in neither upright nor flat on the truck 10, the doubled-up portions of the straps 80 may be fed down through the lower gap between the tailgate 12 and truck 10, allowing gravity to assist the user. The straps 80 may then be grabbed by the user out of the bottom of the tailgate/truck gap and then wrapped up around the bottom of the segment 18. The G-hooks 82 at the apex of the doubled-back strap portions may then be hooked onto/fed through respective webbing loops 84 on the front of the segment 18 that face away from the truck 10. The loops 84 are shown in other figures as well, such as FIGS. 1, 2, 4, 5A, and 5C. This helps secure the covering 16 to the vehicle tailgate 12, with each hook 82 engaging a respective loop 84 on the first segment 18 to establish a first anchor point at the loop 84.

Each strap 80 also passes through a respective sliding/locking buckle 86 and establishes a second anchor point at the segment 26 owing to an end portion 88 of the strap 80 extending past the buckle 86 and being sewn into or other otherwise affixed to the segment 26. And owing to a second, loose end portion 90 of the strap 80 coming from the G-hook 82 being fed through the buckle 86 as well (from a direction of the first anchor point on the segment 18 and toward the second anchor point on the segment 26), the strap 80 may be tightened by the user using the buckle 86. This in turn tightens the strap 80 between the first and second anchor points, securing the covering 16 to the vehicle tailgate 12. Advantageously, the loose end 90 of the strap 80 as well as the buckle 86 then remain inside the tailgate 12 and inside the bed of the truck 10 while the covering 16 is secured to the tailgate 12, whereas if the loose end 90 and/or buckle 86 were left on the outside of the tailgate 12 they would flap in the wind and potentially damage the paint and other exterior portions of the truck 10.

Note that many aspects just described, such as the straps 80 and hooks 82, are shown in other figures such as FIGS. 1, 2, 4, 5A, 6A, and 7A.

Figure 8A:
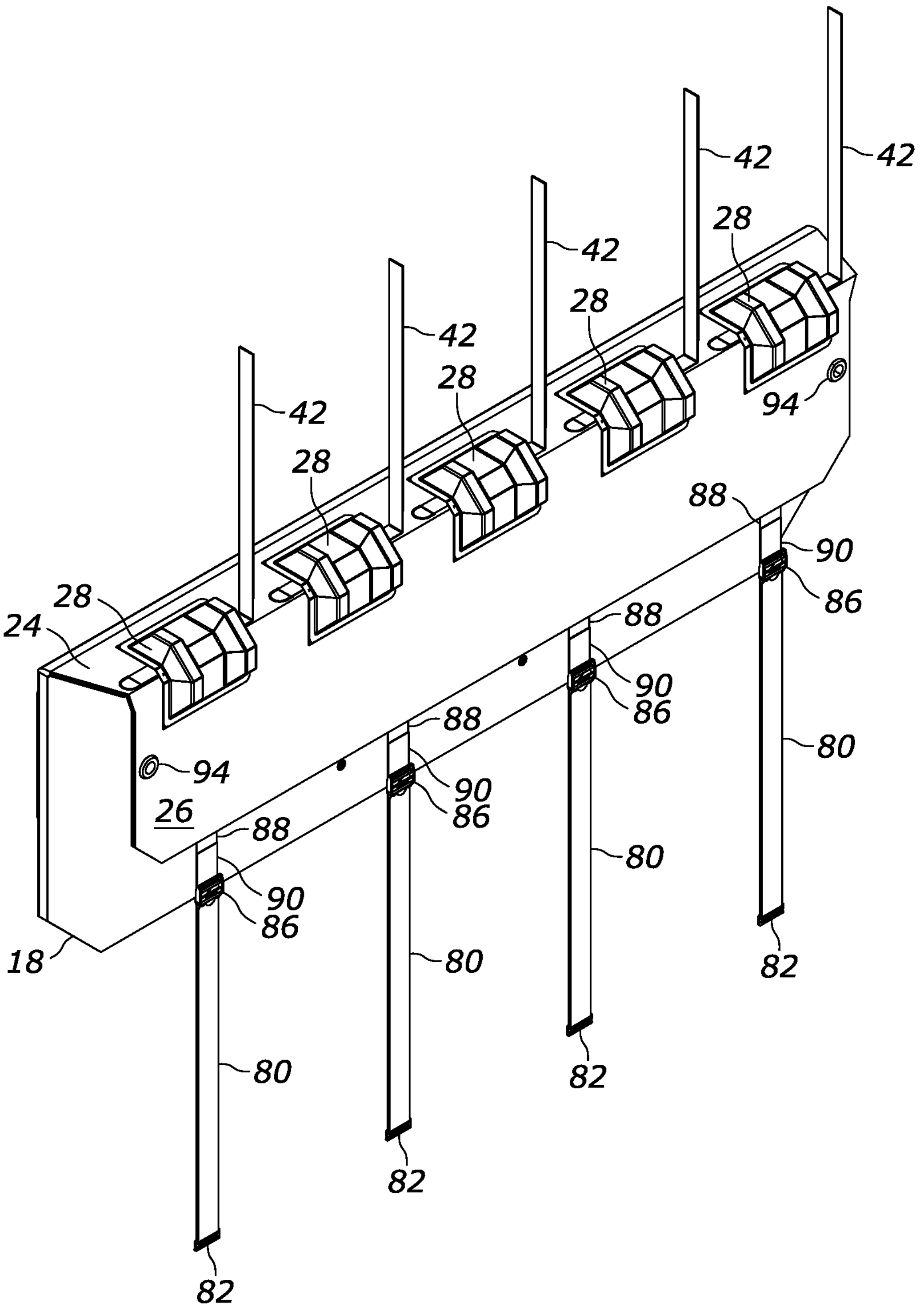
FIG. 8A is a rear isometric view of the apparatus consistent with present principles.
Figure 8B:
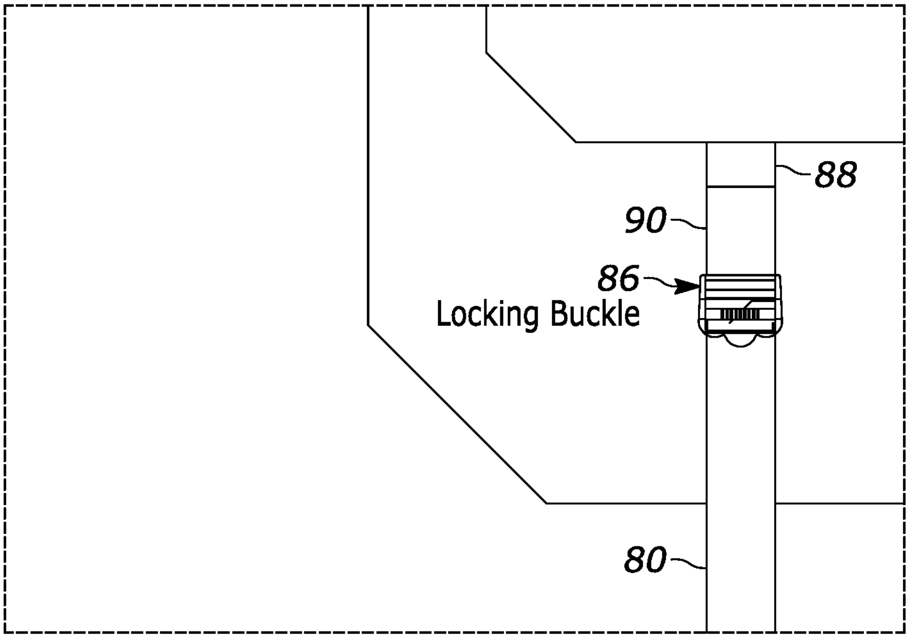
FIGS. 8B and 8C are elevational detailed partial views of a strap as engaged with a covering of the apparatus consistent with present principles.
Figure 8C:
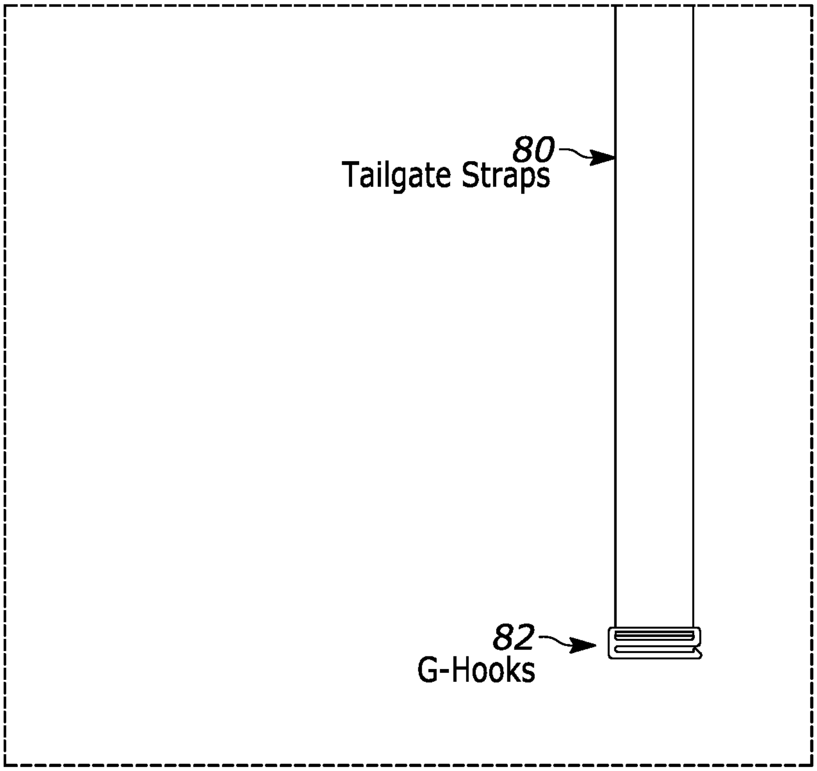

FIG. 8A also shows that respective metal (e.g., stainless steel) or polymer grommets 94 may also be included on the segment 26, with the opening on the inside of the grommet 94 making a hole in the segment 26 itself. A padlock, cable lock, bike lock, or other type of lock may then be engaged with the grommets 94 as well as a portion of the tailgate 12 itself (e.g., a hole or other opening in the third surface of the vehicle tailgate 12 that faces inward toward the truck bed when the tailgate 12 is in the upright position on the vehicle 10 per FIG. 1) to thus lock the covering 16 onto the tailgate 12 to help prevent theft of the covering 16.

Components included in one embodiment can be used in other embodiments in any appropriate combination. For example, any of the various components described herein and/or depicted in the Figures may be combined, interchanged, or excluded from other embodiments.

The term "a" or "an" in reference to an entity refers to one or more of that entity. As such, the terms "a" or "an", "one or more", and "at least one" can be used interchangeably herein.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

It is to be understood that whilst present principals have been described with reference to some example embodiments, these are not intended to be limiting, and that various alternative arrangements may be used to implement the subject matter claimed herein. Accordingly, while particular techniques and devices are herein shown and described in detail, it is to be understood that the subject matter which is encompassed by the present application is limited only by the claims.

What is claimed is:

1. An apparatus, comprising:

a covering configured to engage a vehicle tailgate, the covering comprising:

a first segment configured for positioning on a first surface of the vehicle tailgate, the first surface facing backwards away from a vehicle to which the vehicle tailgate is couplable while the vehicle tailgate is in an upright position as coupled to the vehicle, the first segment comprising a window;

a second segment configured for positioning on a second surface of the vehicle tailgate, the second surface being orthogonal to the first surface; and a third segment configured for positioning on a third surface of the vehicle tailgate, the third segment being coupled to the first segment via the second segment, the third surface being orthogonal to the second surface;

the apparatus further comprising:

a first pad, the first pad being configured to removably engage the second segment and the third segment to provide, at an angle oblique to the second and third surfaces, a cushion for a downtube of a bicycle, the first pad comprising an opening configured to receive part of the downtube; and a second pad, the second pad being different from the first pad, the second pad being configured to slide along one or more elements on the covering, the second pad being configured to slide, via the one or more elements, in a plane parallel to the first segment to uncover a portion of the window to provide a field of view through the portion of the window for a backup camera on the vehicle.

2. The apparatus of claim 1, comprising:

a third pad, the third pad being different from the first and second pads, the third pad being configured to slide along the one or more elements on the covering, the third pad being configured to slide, via the one or more elements, in a plane parallel to the first segment to uncover the portion of the window to provide the field of view via a spaced positioning, on the first segment, of the third pad with respect to the second pad.

3. The apparatus of claim 2, wherein the second and third pads are configured to maintain the spaced positioning on the first segment to both maintain the field of view and provide cushioning at one or more areas around the portion of the window.

4. The apparatus of claim 3, wherein the second pad comprises a first hook and loop fastener component, wherein the third pad comprises a second hook and loop fastener component, and wherein the one or more elements comprise at least a third hook and loop fastener component that is reciprocal to the first and second hook and loop fastener components to engage the first and second hook and loop fastener components to maintain the spaced positioning.

5. The apparatus of claim 1, wherein the one or more elements comprise one or more rails.

6. The apparatus of claim 1, wherein the first pad comprises a first coupling element to removably engage the first pad with the second segment and the third segment.

7. The apparatus of claim 6, wherein the first coupling element comprises a first hook and loop fastener component configured to engage a reciprocal second hook and loop fastener component on the covering.

8. The apparatus of claim 7, wherein the second hook and loop fastener component is disposed on one or more of: the second segment, the third segment.

9. The apparatus of claim 6, wherein at least one of the second and third segments comprises a second coupling element that is couplable to the first coupling element to removably engage the first pad with the second segment and the third segment.

10. The apparatus of claim 9, comprising a strap engageable with the second coupling element, the strap configured to, while engaged with the second coupling element, secure the part of the downtube within the opening.

11. The apparatus of claim 1, comprising at least a first strap configured to secure the covering to the vehicle tailgate, the first strap comprising a hook configured to engage a loop on the first segment to establish a first anchor point, the first strap also engageable with the third segment to establish a second anchor point, the first strap comprising a buckle through which a loose end portion of the first strap is feedable from a direction of the first anchor point and toward the second anchor point to tighten the first strap between the first and second anchor points to secure the covering to the vehicle tailgate.

12. A method, comprising:

providing, as part of a covering for a vehicle tailgate, a first segment configured for positioning on a first surface of the vehicle tailgate, the first surface facing backwards away from a vehicle to which the vehicle tailgate is couplable while the vehicle tailgate is in an upright position as coupled to the vehicle, the first segment comprising a window;

providing, as part of the covering for the vehicle tailgate, a second segment configured for positioning on a second surface of the vehicle tailgate, the second surface being orthogonal to the first surface;

providing, as part of the covering for the vehicle tailgate, a third segment configured for positioning on a third surface of the vehicle tailgate, the third segment being coupled to the first segment via the second segment, the third surface being orthogonal to the second surface; and proving a first pad, the first pad being configured to removably engage the second segment and the third segment to provide, at an angle oblique to the second and third surfaces, a cushion for a downtube of a bicycle, the first pad comprising an opening configured to receive part of the downtube.

13. The method of claim 12, comprising:

providing a second pad, the second pad being different from the first pad, the second pad being configured to slide along one or more elements on the covering, the second pad being configured to slide, via the one or more elements, in a plane parallel to the first segment to uncover a portion of the window to provide a field of view through the portion of the window for a backup camera on the vehicle.

14. The method of claim 12, wherein the first pad comprises a first coupling element to removably engage the first pad with the second segment and the third segment, and wherein at least one of the second and third segments comprises a second coupling element that is couplable to the first coupling element to removably engage the first pad with the second segment and the third segment.

15. The method of claim 14, comprising:

providing a strap engageable with the second coupling element, the strap configured to, while engaged with the second coupling element, secure the part of the downtube within the opening.

16. An apparatus, comprising:

a covering configured to engage a vehicle tailgate, the covering comprising:

a first segment configured for positioning on a first surface of the vehicle tailgate, the first surface facing backwards away from a vehicle to which the vehicle tailgate is couplable while the vehicle tailgate is in an upright position as coupled to the vehicle;

a second segment configured for positioning on a second surface of the vehicle tailgate, the second surface being orthogonal to the first surface;

a third segment configured for positioning on a third surface of the vehicle tailgate, the third segment being coupled to the first segment via the second segment, the third surface being orthogonal to the second surface;

wherein the apparatus further comprises one or more of:

a first pad, the first pad being configured to removably engage the cover to provide, at an angle oblique to the second and third surfaces, a cushion for a bicycle;

a second pad, the second pad being different from the first pad, the second pad being configured for selective coupling to the covering to provide a field of view for a camera on the vehicle.

17. The apparatus of claim 16, comprising the first pad.

18. The apparatus of claim 16, comprising the second pad.

19. The apparatus of claim 16, comprising the first pad and the second pad.

20. The apparatus of claim 16, comprising a third pad, the third pad being configured to removably engage the cover to provide, at an angle oblique to the second and third surfaces, a cushion for a piece of sporting equipment, the third pad being wider than the first pad.

* * * * *